United States Patent [19]

Erbacher et al.

[11] 4,207,388
[45] Jun. 10, 1980

[54] COPPER (II) CHLORIDE-TETRACHLOROALUMINATE BATTERY

[75] Inventors: John K. Erbacher, Fairborn, Ohio; Charles L. Hussey, University, Mich.; Lowell A. King, Colorado Springs, Colo.

[73] Assignee: The United States of America as represented by the Secretary of the Air Force, Washington, D.C.

[21] Appl. No.: 964,870

[22] Filed: Nov. 29, 1978

[51] Int. Cl.² .............................................. H01M 6/36
[52] U.S. Cl. .................................... 429/112; 429/191; 429/220

[58] Field of Search ........................ 429/112, 191, 220

[56] References Cited

U.S. PATENT DOCUMENTS

| | | | |
|---|---|---|---|
| 3,751,298 | 8/1973 | Senderoff | 429/112 |
| 4,064,327 | 12/1977 | King et al. | 429/112 |
| 4,117,207 | 9/1978 | Nardi et al. | 429/112 X |

Primary Examiner—Charles F. Lefevour
Attorney, Agent, or Firm—Joseph E. Rusz; William J. O'Brien

[57] ABSTRACT

A pelletized, light weight, thermal battery having copper (II) chloride and an alkali tetrachloroaluminate as electrolytic components.

6 Claims, 1 Drawing Figure

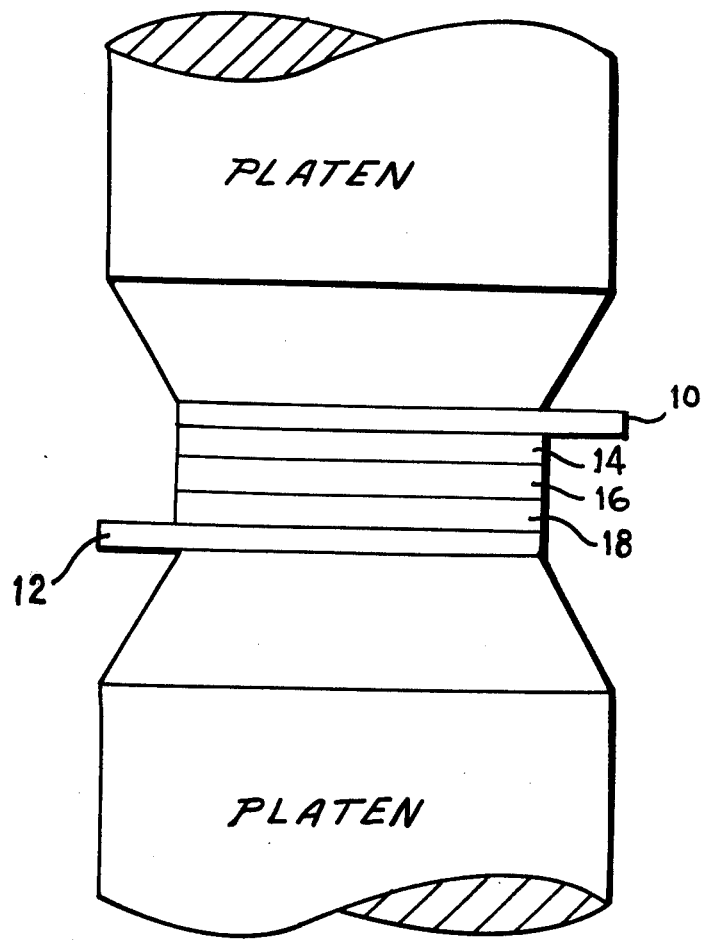

COPPER (II) CHLORIDE-TETRACHLOROALUMINATE BATTERY

STATEMENT OF GOVERNMENT INTEREST

The invention described herein may be manufactured and used by or for the Government for governmental purposes without the payment of any royalty thereon.

BACKGROUND OF THE INVENTION

This invention relates to a light weight, thermally activated, electrochemical power supply. More particularly this invention concerns itself with a thermally activated, pelletized, reserve battery comprising a single cell, or a stacks of individual cells, which utilizes copper (II) chloride and an alkali tetrachloroaluminate as electrolytic ingredients.

The present interest and development of light weight communication systems for airborne applications has generated a considerable research effort in an attempt to provide light weight power sources for use in those systems. One type of power source which has proven effective is that which is thermally activated. The thermally activated characteristics of this power source provide the communication system with a power source of essentially unlimited storage life, rapid and reliable activation, and the ability to withstand the stress and strain encountered within an operational aerospace environment.

Considerable interest in the development of thermally activated galvanic cells has taken place in the aerospace field since World War II. Early cells utilized a "cup and cover", or similar design, which was followed by the development of a "pelletized cell". Further research in pellet cell technology took place with the eventual fabrication of a completely pelletized thermal battery for use in a variety of electrochemical systems. These power sources utilized electrolyts of inorganic salts that remained solid and inactive at storage temperatures. The power source or electrochemical cell was activated by heating the cell to an elevated temperature. The inorganic salt electrolyte melted under elevated temperature conditions and became ionically conductive. The elevated temperatures necessary for activation was generally provided by pyrotechnic heat sources such as heat powders or heat papers.

Generally, current production thermal batteries are characterized by the utilization of a LiCl-KCl eutectic electrolyte, an operational temperature within the range of about 400° C. to 600° C., and a lifetime ranging from a few seconds to several minutes. Recent workk has shown that current thermal battery systems can operate for as long as an hour under suitable conditions. This improvement in activated lifetime indicates that thermal batteries are desirable power source for long life applications, including guided bombs, missiles, ECM devices, and torpedoes. However, a disadvantage of present thermal battery systems for long life applications is the 400° to 600° C. operating temperature range. The high operating temperature range necessitates heavier insulation to attain the extended lifetime and to prevent overheating of adjacent electronic components.

During recent years, problems have also arisen with certain chemical components required for thermal batteries. For example, health hazards associated with Cr(VI) compounds and shortages of some raw materials has led to renewed interest in alternate electrochemical couples for the present electrolyte system. Completely new electrolyte systems and couples for thermal battery applications are also desired. Amongst the desirable characteristics for these new systems are a lower operating temperature which would reduce insulation requirements, battery volume, and conserve heat producing materials required for activation. Also, the avoidance of Cr(VI) compounds for the cathode would eliminate a primary carcinogenic health hazard.

Several electrolytes have been investigated to evalute their applicability to low temperature thermal batteries. For example, it has been determined that a 70:30 m/o (mole %) KSCN-NaSCN electrolyte in conjunction with various lithium metal alloy anodes and a $V_2O_5$ cathode shows promise for high spin artillery shell applications. A heat reservoir to stabilize operational temperatures in a KSCN-NaSCN electrolyte system also has been developed. Unfortunately, these materials as well as other known materials, do not overcome the problems recited above.

With the present invention, however, it has been discovered that Copper (II) chloride provides an excellent candidate for a long life, pelletized, thermal battery system. Based on the evaluation of other cathodes, it has been determined that the open circuit and load voltages can be enhanced by utilizing Copper (II) chloride as a cathode in a $LiAl/NaAlCl_4/CaCl_2$ cell coupled with a maximum energy density in the 200° to 255° C. temperature region.

SUMMARY OF THE INVENTION

The present invention concerns itself with light weight, thermally activated battery which consists of a single cell or a stack of individual cells. The individual cell consists of a lithium, aluminum, or lithium-aluminum alloy, either with or without an electrolyte binder mix, as the anode. A separating electrolyte composed of a finely divided silica or kaolin binder and an alkali tetrachloroaluminate is positioned between the anode and a catholyte. The catholyte is composed of copper (II) chloride, graphite, and a single or mixed electrolyte of alkali tetrachloroaluminate plus binder. The battery is related in concept to the aluminum-chloride thermal battery described in U.S. Pat. No. 4,064,327, issued Dec. 20, 1977 to King et al. However, it represents an unexpected improvement over the latter battery, especially in regard to cathode materials. The King et al patent also describes in greater detail the theory, construction and operation of a thermal battery utilizing alkali tetrachloroaluminate electrolytes. The present invention provides the first use of copper (II) chloride in an expendable, primary, thermal battery and the first use of an aluminum alloy to generate, in situ, an aluminum anode without the passivation normally encountered with aluminum anodes. It also provides an improved performance in the conservation of insulation materials and the elimination of a carcinogenic chromium VI compound as the cathode material.

Accordingly, the primary object of this invention is to provide a reliable light weight, thermally activated, reserve electrochemical power supply.

Another object of this invention is to provide a thermally activated, reserve battery in pelletized form that utilizes copper (II) chloride as an electrolytic material.

Still another object of this invention is to provide an electrochemical cell that is readily expendable, light weight, thermally activatable at low temperatures, reliable and characterized by an extended storage life.

The above and still other objects and advantages of the present invention will become more readily apparent upon consideration of the following detailed description thereof when taken in conjunction with the accompanying drawing.

DESCRIPTION OF THE DRAWING

In the drawing:

The FIGURE represents a typical cell configuration of this invention positioned between two heated platens.

DESCRIPTION OF THE PREFERRED EMBODIMENT

Pursuant to the above-defined objects, the present invention provides a thermally activated electrochemical power source that utilizes copper (II) chloride as an electrolytic material.

Copper (II) chloride is not a new cathode material. It has been suggested for use in bulk cells of the type Li or LiAl/LiAlCl$_4$-aprotic solvent/CuCl$_2$. Also, it has been evaluated as a cathode for production thermal batteries by comparing the CuCl$_2$ to CaCrO$_4$ in single cells of the type Ca/LiCl—KCl/CaCrO$_4$ operating from 400°-550° C. at 60 mA/cm$^2$. The average peak voltage was 22.28 V and the maximum cell lifetime to 80% of peak voltage was 4.95 minutes at 450° C. The past performance of CuCl$_2$ single cells, however, did not warrant their use as a cathode material when compared with other cathode materials. The use of CuCl$_2$ as a cathode in the system LiAl/LiAlCl$_4$/CuCl$_2$ has also been suggested but, the open circuit voltage data reported did not correspond to that for the LiAl/CuCl$_2$ couple utilizing a NaAlCl$_4$ electrolyte observed by the inventor. The data, however, does agree very well with that observed for an Al/CuCl couple.

The basic electrochemistry of CuCl$_2$ in a NaCl–AlCl$_3$ electrolyte was studied during the present invention by using cyclic voltammetry, pulse polarography, and potentiometry. It was determined that Cu(II) in a chloride-rich NaAlCl$_4$ melt at 175° C. undergoes two reduction steps in accordance with the following equations:

$$Cu(II) + e^- \rightleftharpoons Cu(I) \quad (1)$$

$$Cu(I) + e^- \rightleftharpoons Cu(0) \quad (2)$$

The first wave, at about 1.66 V versus an Al reference electrode in the 1:1 melt (defined as 50:50 m/o AlCl$_3$::NaCl), is of primary importance in battery applications and appears to be a well behaved reversible electromechanical couple. The E° value reported for the Cu$^{2+}$/Cu$^+$ couple was 1.817±0.005 V at 175° in the 1:1 melt. It was also found that CuCl$_2$ was slightly soluble in that electrolyte, approximately 5 mM. Additional studies on LiAl/NaAlCl$_4$/CuCl$_2$ single cells included the effects of: different commercial graphites; catholyte graphite content; CuCl$_2$ particle size; LiAl alloy composition versus sheet and powdered Al; current density; and temperature. The composition and compaction pressures for the single cell illustrated in the FIGURES of the drawing are given in Table I. Bilayer pellets for use with sheet anodes were identical to trilayer pellets without the anode layer.

TABLE I

| Layer | Component | Weight[a,b] (g) | Pressure[c] (PSIA) |
|---|---|---|---|
| Anode | Al or Li-Al powder | 0.500 | 16,700 |
|  | EB Mixture[d] | 0.500 |  |
| Separator | EB Mixture[d] | 0.900 | 23,000 |
|  | EB Mixture[d] | 0.450 |  |
| Cathode | CuCl$_2$ | 0.500 | 29,200 |
|  | Graphite | 0.160 |  |

[a] All components were weighted to ±0.005 g.
[b] Total single cell weight was not allowed to vary more than ±2%.
[c] All pressures were regulated to ±400 PSIA.
[d] EB Mixture:Electrolyte (49.85 m/o AlCl$_3$-50.15 m/o NaCl) + 10 w/o Binding Agent (Cab-O-Sil).

With reference again to the drawing, there is disclosed a typical, pelletized cell configuration of this invention positioned between two heated plates or platens. The pelletized cell comprises two current collectors 10 and 12 having an anode 14, an electrolyte 16 and a catholyte 18 sandwiched therebetween. The battery pellets were formed in a 1.125 inch Carver die. The technique for forming a pellet was to spread the desired weight of anode material, homogeneously mixed with the EBM, or without the EBM, evenly over the die surface and press it into a pellet. A second layer of the EBM was spread over the anode pellet and pressed into a bipellet. A third layer, the cathode, comprising a homogeneous mixture of the requisite amounts of copper (II) chloride, EBM, and graphite, was evenly spread over the bipellet on the pure EBM side and pressed to form the three-layered single cell. In those cases where a sheet rather than a powdered anode material was used, a bipellet consisting of the EBM and cathode sections of the three-layered pellet was pressed.

There is considerable possible variation in anode, cathode, and EBM compositions, and platen press pressure, die pressure and the amount of material in each layer of the single cell. As a result the amounts set forth in the example which follows should be considered only as illustrative. It should be noted also that no disclosure is made of heat paper or powder, nor multiple cell stacks, nor typical thermal battery containers. These technologies are well established and those skilled in the art would be able to accommodate these thermal battery components to the Copper (II)) Chloride-Tetrachloroaluminate system of this invention. The fabrication of a typical cell is illustrated by the following specific example with test results for the cell of the example set forth in Run No. 18 of Table IV.

EXAMPLE 28 weight percent (60.2 atomic percent) lithium alloyed with aluminum and received in powder form from the manufacturer (Foote Mineral Co.), was used without further treatment. LiAl (0.500 g) and EBM (0.500 g) were homogeneously mixed and placed in the Carver die and pressed at 16,700±400 psia to form the anode 14.

Dry EBM (0.900 g) was placed in the Carver die, spread evenly over the previously compressed anode and pressed to 23,000±400 psia to form the electrolyte 16.

The anhydrous copper (II) chloride (Alfa/Ventron Inc.) 51.3% Cl, equivalent to 98.6% CuCl$_2$, was sieved and 0.500 g of the 50–100 ASTM mesh particles were mixed with 0.450 g stock EBM and 0.210 g graphite (Superior No. 2 Flakes—previously gound in a Micro-Mill and purified at 600° C. under a chlorine atmosphere). The homogeneous blend was evenly spread over the bipellet already in the Carver die. The entire pellet was then pressed at 29,200±400 psia to form the catholyte 18. The current collectors were formed from pure nickel sheet (Atlantic Equipment Engineers), 0.345 mm (13.6 mil) thick and 1.125 inch diameter with tab and burnished with emery paper, washed with water and acetone and stored under an argon inert atmosphere until needed. If the collectors were stored longer than 24 hours they were burnished with emery cloth again just prior to use.

The fabrication of the cell of this invention preparation of the electrolyte, and the single cell discharge testing procedures, which will be explained in greater detail hereinafter, were conducted in either a nitrogen or argon filled inert atmosphere system (Vacuum/Atmospheres Co. Model HE-43-6 Dri-Lab/HE-493 Dri-Train). The moisture content was maintained below 15 PPM$_V$ and the oxygen content was estimated to be 5 PPM$_V$. Initially, all experiments were performed under a nitrogen atmosphere, but when lithium-aluminum alloys were used as anodes the atmosphere was converted to argon to preclude formation of lithium nitrides and the associated lithium fire hazard.

The aluminum chloride was anhydrous iron free A.G. aluminum chloride obtained from Fluka through Tridom Chemical Inc. and was used as received. The sodium chloride was "Baker Analyzed" reagent grade sodium chloride and used as received. The binding agent used to immobilize electrolyte was Cab-O-Sil, a high surface area fumed silicon dioxide obtained from the Cabot Corporation. It was dried at 400° C. for one hour prior to use.

The copper (II) catholyte material was chloride-anhydrous copper (II) chloride (51.3% Cl equivalent to 98.6% CuCl$_2$) obtained from Alfa-Ventron, Inc. in crude granular form. It was subsequently separated using standard ASTM sieves into 30, 30–50, 50–100, and 100 mesh sizes. In addition, a small quantity was ground in a CRC Micro-Mill to pass through an ASTM 250 mesh sieve.

The graphite component was a commercial graphite obtained from Fisher Scientific Co. (Grade #38), Alfa-Ventron, Inc. (99.5% pure, 300 mesh), and Superior Graphite Co. (No. 1 large graphite flakes). The Superior graphite flakes were ground before use in a CRC Micro-Mill while the others were used as received. Half of the ground graphite flakes were also purified at 600° C. under a chlorine atmosphere.

The aluminum component was sheet aluminum obtained from the Aluminum Corporation of America (99.5% pure, 0.0323 cm thick). It was cut to 2.86 cm diameter circles, polished with emery cloth, rinsed with distilled water and acetone, and stored in the inert atmosphere system until needed. Powdered aluminum (99.9% pure, 100 mesh) was obtained from Research Organic/Inorganic Chemicals Co. and used as received.

The lithium-aluminum alloys were obtained from Foote Mineral Co. (90.2 a/o lithium sheet, and 60 and 70 a/o lithium powder) and from Kawecki-Beryloo Industries, Inc. (48 a/o lithium powder; 40–200 mesh) and stored under an argon atmosphere. The alloy powders were used as received. The alloy sheet was cut to a 2.86 cm diameter circle prior to use. A lithium metal disperson sample from the Foote Mineral Company Lot No. 208-1 was obtained and stored under an argon atmosphere. It was used as received. The current collectors were fabricated from pure nickel sheet (0.0345 cm thick), obtained from Atlantic Equipment Enginerrs. It was trimmed to the desired circle and tab and treated prior to use in the same manner as the sheet aluminum was treated. The current collectors were used repeatedly throughout the single cell experiments and were cleaned prior to each use.

In preparing the electrolyte medium, aluminum chloride was fused with excess sodium chloride at 175° C. and electrolytically purified for 24 hours. Ten w/o (weight percent) Cab-O-Sil was combined with the molten NaCl-AlCl$_3$ mixture at 175° C. to form a homogeneous paste, 10 w/o in the binder. The resulting electrolyte binder, hereinafter referred to as the "EB mixture" or "EBM", was cooled, ground to a powder with a CRC Micro-Mill, and stored under an inert atmosphere. The sodium tetrachloroaluminate/binder mixes used in the anode 14, separating electrolyte 16, and catholyte 18 usually had the same composition, but were purposely changed in some tests to examine battery performance based on the overall catholyte composition. The anodic and cathodic current collectors 10 and 12 may be either nickel, tungsten, stainless steel, or molybdenum. Operating temperatures ranged from 175° C. to 275° C. The single cells were typically held in position between the platens with pressure of 3.0 to 4.5 psia.

The electrolyte was prepared by fusing analytical grade aluminum chloride with an excess of reagent grade sodium chloride at 175° C. followed by electrolytic purification of the molten electrolyte between two pure Al electrodes at 175° C. for at least 24 hours at a current density of 1.5 mA/cm$^2$ (net composition was ca. 50.2 mole % NaCl, 49.8 mmole % AlCl$_3$). The binder material, Cab-O-Sil, was fused at 400° C. for one hour prior to use.

The electrolyte-binder mix (EBM) was prepared by adding the specified amount of binder by weight to the electrolyte at 175° C. to form a homogeneous paste. The resulting EBM was cooled, ground to a powder by a CRC Micro-Mill of the Chemical Rubber Co., and stored under an argon inert atmosphere until needed.

Single cells fabricated in accordance with this invention were tested by discharging in a conventional Platen Press Single Cell Tester. The platen heads were heated by means of two Thunderbolt TB-381, 120 V, 100 watt cartridge heaters (Vulcan Electric, Inc.) in each platen wired in parallel to an Electromax III Controller (Leeds and Northrup, Inc.). Chromel-alumel thermocouples were used as temperature sensors. Temperature readout was obtained from an ice/water referenced chromel-alumel thermocouple to a DANA Model 5330/700 digital multimeter (DMM). The analog output from the DMM was recorded graphically using an H-P 7100 B recorder. Each platen could be heated from room temperature to a stable 175° C. in three minutes and be controlled to ±0.3° C. Pressure on the single cells during testing was maintained at 3±0.25 psia using high purity argon. In testing constant current discharge an additional set of leads was connected across the single cell which allowed the cell voltage to be ampled by a DEC PDP 11/10C Data Acquisition system. Cell voltage, time, coulombs, experimental energy density, and the digital voltage-time curve for each cell were output by the DAS.

A series of test utilizing graphite evaluated the dependence of the discharge curve on the quantity of graphite present in the cell. The results are summarized in Table II and indicate a maximum in energy density and charge delivered at 0.21 g of graphite as well as a flatter discharge curve. This maximum is believed to be the result of a better contact between the $CuCl_2$ and graphite particles which improves the efficiency of the cathodic reaction, as the quantity of graphite increases, and the decreased structural stability of the cathode layer as the quantity of graphite increases. As the graphite content of the cathode layer in the pellet increases there is an increased different in the expansion coefficient between the cathode layer and the rest of the pellet. When the pellet is removed from the die during fabrication this expansion coefficient different causes delamination of the pellet. In addition, the more graphite present the weaker the cathode becomes due to a reduction in the percent binder in that layer; it crumbles more easily. These two physical problems offset the increased electrical contact and result in a peak in the cell performance under constant current discharge conditions.

Testing of the $CuCl_2$ cathode material showed a variation in particle size. This variation was causing lack of reproducibility of single cell discharge data and occasional pellet fabrication problems. To eliminate these difficulties some of the $CuCl_2$ was ground in a CRC Micro-Mill and tested in a single cell. Performance of this cell was not as desirable as that of the unground stock $CuCl_2$. The performance degradation could be due to an optimum particle size present in unground $CuCl_2$, or decomposition of the ground $CuCl_2$ while exposed to atomspheric moisture and oxygen during transfer between Dri-Boxes. To test the two possibilities, half the stock $CuCl_2$ was sieved and a fresh sample was ground under inert atmosphere conditions in the same Dri-Box that was used for the single cell tests. After the initial test data confirmed both possibilities, further tests were conducted on some of the sieved samples of $CuCl_2$ to elucidate particle size-current density and particle size-temperature effects. These latter tests were to define an optimum particle size for more extensive current density and temperature studies. The results of the $CuCl_2$ particle size studies are reported in Table III.

TABLE II

DISCHARGE BEHAVIOR AS A FUNCTION OF GRAPHITE CONTENT AT 15.0 mA/cm² and 200° C.$^a$

$V^d$: 0.8 Volts

TABLE III

DISCHARGE BEHAVIOR AS A FUNCTION OF $CuCl_2$ PARTICLE SIZE$^a$

|  |  |  | Particle |  |  | $COV^d$: 1.0 Volts | | |
|---|---|---|---|---|---|---|---|---|
| Run No. | Temp. (°C.) | Current Density (mA/cm²) | Size (ASTM Mesh) | $OCV^c$ (Volts) | iR Drop (Volts) | Life-time (min) | Energy Density (W-Hrs/lb) | Charge (Coul) |
| 5 | 175 | 3.95 | 30 | 1.826 | 0.037 | 86.0 | 8.98 | 129 |
| 6 | 175 | 3.95 | 30-50 | 1.824 | 0.037 | 148.7 | 15.0 | 223 |
| 7 | 175 | 3.95 | 50-100 | 1.824 | 0.037 | 201.3 | 19.2 | 302 |
| 8 | 175 | 3.95 | 100 | 1.821 | 0.032 | 203.0 | 19.9 | 304 |
| 9 | 175 | 3.95 | Ground | 1.829 | 0.054 | 138.0 | 14.1 | 207 |
| 10 | 175 | 3.95 | Ground | 1.831 | 0.058 | 55.0 | 5.26 | 82.5 |
| 11 | 175 | 60.0 | 50-100 | 1.831 | 0.244 | 6.65 | 8.55 | 153.5 |
| 12 | 175 | 60.0 | 30-50 | 1.826 | 0.232 | 2.55 | 3.44 | 58.8 |
| 13 | 250 | 15.0 | 100 | 1.875 | 0.549 | 1.5 | 0.48 | 10.6 |
| 14 | 250 | 15.0 | 50-100 | 1.873 | 0.151 | 10.0 | 3.35 | 57.8 |

$^a$Cell Configuration
Anode
  0.500g LiAl (48 a/o)
  0.500g EB Mixture$^b$
Separator
  0.900 EB Mixture$^b$
Cathode
  0.450g EB Mixture$^b$
  0.500g $CuCl_2$ (paticle size - see 4th column)
  0.160g Graphite (Superior-purified)
$^b$EB Mixture:
  Electrolyte (49.85 m/o $AlCl_3$-50.15 m/o NaCl) + 10 w/o Binding Agent (Cab-O-Sil)
$^c$OCV - Open Circuit Voltage
$^d$COV - Cut Off Voltage

| Run No. | Graphite Wt (g) | Total Cell Wt (g) | $OCY^c$ (Volts) | iR Drop (Volts) | Life-time (min) | Density (W-Hrs/lb) | Chrg (Coul) |
|---|---|---|---|---|---|---|---|
| 1 | 0.110 | 2.950 | 1.831 | 0.122 | 60.7 | 13.1 | 350 |
| 2 | 0.160 | 2.995 | 1.831 | 0.093 | 56.0 | 17.5 | 324 |
| 3 | 0.210 | 3.060 | 1.831 | 0.083 | 59.0 | 19.4 | 341 |
| 4 | 0.260 | 3.070 | 1.834 | 0.090 | 50.0 | 16.7 | 289 |

$^a$Cell Configuration
Anode
  0.500g LiAl (e8 a/o)
  0.500g EB Mixture$^b$
Separator
  0.900g EB Mixture$^b$
Cathode
  0.450g EB Mixture$^b$
  0.500g $CuCl_2$ (50-100 mesh
  Graphite (Superior-purified), as indicated in the 2nd col.
$^b$EB Mixture: Electrolyte (49.85 m/o $AlCl_3$-50.15 m/o NaCl) + 10 w/o Binding Agent (Cab-O-Sil)
$^c$OCB - Open Circuit Voltage
$^d$COV - Cut Off Voltage Several conclusions may be drawn from the data in Table III. First, a comparison of runs 9 and 10 confirm degradation of the ground $CuCl_2$ by exposure to atmospheric moisture and oxygen. Secondly, at a low current density discharge, smaller $CuCl_2$ particles, 100 mesh, perform better than larger ones. Thirdly, the 50-100 mesh particle size optimizes single cell performance over the current density and temperature ranges of interest. Subsequent studies on anodes, current density, and temperature utilized the 50-100 mesh $CuCl_2$.

During the early part of the testing programs, Al, Li, and 48 a/o LiAl alloy were the available anodes for testing. From single cell test data, the 48 a/o alloy was selected as the anode to be used for current density and temperature studies. Other LiAl alloys were also tested. The 60.2 and 70.4 a/o alloys proved superior to the 48 a/o alloy, but to preclude lengthy retesting the current density and temperature studies were completed using the 48 a/o alloy. Discharge data for all the anodes tested were recorded to a cut off voltage, COV, of zero volts to determine overall coulombio and experimental energy density efficiencies. The results to the anode study are reported in Table IV.

TABLE IV
DISCHARGE BEHAVIOR AS A FUNCTION OF DIFFERENT ANODES AT 15.0 mA/cm² and 175° C.$^a$

| | | | | | COV$^e$: 0.0 Volts | | |
| Run No. | Anode | Anode$^c$ Wt (g) | Cell Wt (g) | OCV$^d$ (Volts) | iR Drop (Volts) | Lifetime (min) | Energy Density (W-Hr/lb) | Chg (Coul) |
| --- | --- | --- | --- | --- | --- | --- | --- | --- |
| 15 | Al powder | 0.500 | 2.995 | 1.797 | 0.449 | 102.8 | 8.92 | 594 |
| 16 | Al plate | 0.500 | 2.410 | 1.790 | 0.345 | 95.0 | 17.4 | 549 |
| 17 | 48.0 a/o LiAl powder | 0.500 | 2.985 | 1.821 | 0.093 | 113.3 | 24.4 | 655 |
| 18 | 60.2 a/o LiAl powder | 0.500 | 2.995 | 1.831 | 0.110 | 116.0 | 27.8 | 670 |
| 19 | 70.4 a/o LiAl powder | 0.500 | 2.970 | 1.819 | 0.093 | 117.8 | 27.3 | 680 |
| 20 | 90.9 a/o LiAl plate | 0.630 | 2.610 | 1.926 | 0.188 | 104.0 | 21.7 | 601 |
| 21 | Li powder | 0.078 | 2.068 | 1.909 | 0.225 | 34.0 | 11.9 | 196 |

$^a$Cell Configuration
See table - Anode Material
Anode
  0.500g EB Mixture$^b$
Separator
  0.900g EB Mixture$^b$
Cathode
  0.450g EB Mixture$^b$
  0.500g CuCl$_2$ (50-100)
  dGraphite (Superior-purified)
$^b$EB Mixture: Electrolyte (49.85 m/o AlCl$_3$-50.15 m/o NaCl + 10 w/o Binding Agent (Cab-O-Sil)
$^c$No electrolyte - Cab-O-Sil mix was used in the anode in Run Nos. 1008-4, 12, and 26
$^d$OCV - Open Circuit Voltage
$^e$COV - Cut Off Voltage Initial tests which coupled pure Al and the 48 a/o alloy with the CuCl$_2$ cathode indicated that the cell output was enhanced considerably using the alloy anode. The enhanced cell output could be due to the prevention of formation of an oxide coating on Al by alloying it with Li. The removal of the oxide coating by reation with the Li during cell discharge may also be a contributing factor; as well as the actual cell discharge reaction being a mixed potential with both the Li and Al coupled to the CuCl$_2$.

The test data also showed a high voltage spike during cell activation with the LiAl alloy which was not present with the pure Al anode. The magnitude of the voltage spike suggested that it is due to participation of Li in the cell reaction. This supposition was verified using a pure Li anode which showed an identical spike.

The actual electrochemical reaction which takes place during the cell discharge is still not clear. Either reaction of the Al produced by Li reacting with the electrolyte, or direct reaction of Li produced by dissociation of the alloy anode could be the sustaining electrochemical reaction. The magnitude of the cell OCV at the discharge temperature as well as the behavior of the cell voltage during activation lend credence of the Li-electrolyte reaction.

Based on the experimental data reported here, it has been proposed that a probable mechanism for the reaction of LiAl alloy anodes in NaCl saturated AlCl$_3$-NaCl electrolytes would be that which is demonstrated by the following equations:

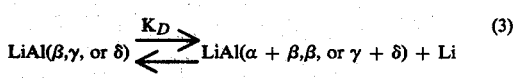

followed by:

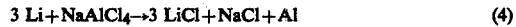

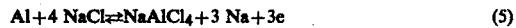

and/or

For a cathodic 2e$^-$ reduction of CuCl$_2$,

the overall reaction stochiometry for the single cell is

The performance of the LiAl/CuCl$_2$ couple to 80% of the Initial Closed Circuit Voltage (ICCV) was evaluated at current densities from 2.00 to 120 mA/cm$^2$. The 80% criteria was based on required performance specifications for numerous production thermal batteries. The results are reported in Table V and indicate the EED decreases as the current density increases. Similar behavior at 175° has been observed utilizing a MoCl$_5$ cathode.

TABLE V
DISCHARGE BEHAVIOR AS A FUNCTION OF CURRENT DENSITY AT 175° C.$^a$

| Run No. | Current (m/A) | Current Density$^c$ (mA/cm$^2$) | CCV$^d$ (Volts) | COV$^e$ (Volts) | Lifetime (min) | Energy Density (W-Hr/lb) |
| --- | --- | --- | --- | --- | --- | --- |
| 22 | 12.8 | 2.00 | 1.824 | 1.459 | 301 | 16.7 |
| 23 | 50.3 | 7.85 | 1.763 | 1.410 | 60.0 | 12.5 |

TABLE V-continued
DISCHARGE BEHAVIOR AS A FUNCTION OF CURRENT DENSITY AT 175° C.[a]

| Run No. | Current (m/A) | Current Density[c] (mA/cm$^2$) | CCV[d] (Volts) | COV[e] (Volts) | Life-time (min) | Energy Density (W.-Hr/lb) |
|---|---|---|---|---|---|---|
| 24 | 96.3 | 15.0 | 1.738 | 1.383 | 30.4 | 11.8 |
| 25 | 192 | 30.0 | 1.689 | 1.352 | 12.0 | 8.72 |
| 26 | 385 | 60.0 | 1.587 | 1.270 | 4.37 | 5.94 |
| 27 | 513 | 80.0 | 1.384 | 1.107 | 2.07 | 3.23 |
| 28 | 641 | 100 | 1.315 | 1.052 | 1.08 | 1.96 |
| 29 | 770 | 120 | 1.306 | 1.045 | 1.045 | 1.31 |

[a]Cell Configuration
Anode
  0.500g LiAl (48 a/o)
  0.500g EB Mixture[b]
Separator
  0.900g EB Mixture[b]
Cathode
  0.450g EB Mixture[b]
  0.500g CuCl$_2$ (50–100 mesh)
  0.160g Graphite (Superior-purified)
[b]EB Mixture: Electrolyte (49.85 m/o AlCl$_3$-50.15 m/o NaCl) + 10 w/o Binding Agent (Cab-O-Sil)
[c]Surface Area of each cell was 6.41 cm$^2$
[d]IOCV - Closed circuit Voltage at time zero
[e]COOV - Cut Off Voltage measured to 80% of the ICCV In evaluating the performance of an electrochemical couple, a determination of the cell resistance is necessary to determine the inherent current limitation of the cell. High values of cell resistance result in low efficiency and poor battery performance from internal heat losses. A convenient and quick method for determining cell resistance is the conventional two-step current method. This method requires a value of the ICCV at two different currents and is readily adapted to multiple measurements using graphical techniques. The least squares value of the resistance of the cells used over the current range studied was 0.72; the data are given in Table V.

Variations in cell resistance as a function of the extent of discharge is an indication of the solubility of the discharge products. An increase in internal resistance indicates the products are generally not soluble; correspondingly, a decreasing or constant cell resistance indicates the products are soluble in some degree. To determine single cell resistance versus extent of discharge, a single cell was discharged at 15.0 mA/cm$^2$ for 10 minutes, followed by interruption of the current for 3 minutes. This cyclic discharge was repeated until the cell discharge voltage dropped to zero volts. The cell resistance values are reported in Table VI and indicate that the discharge products of the LiAl/CuCl$_2$ couple are insoluble. As the discharge reaction changes to the Cu(I)/Cu(0) couple, the cell resistance drops again and remains fairly constant during the remainder of the

TABLE VI
CELL RESISTANCE AS A FUNCTION OF EXTENT OF DISCHARGE AT 96.3 mA 175° C.

| Cycle[c] No. | OCV[d] (Volts) | CCV[e] (Volts) | Resist.[f] (Ω) | Discharge[g] Fraction |
|---|---|---|---|---|
| 1 | 1.816 | 1.733 | 0.86 | 0.000 |
| 2 | 1.812 | 1.702 | 1.14 | 0.085 |
| 3 | 1.741 | 1.624 | 1.22 | 0.170 |
| 4 | 1.699 | 1.545 | 1.60 | 0.254 |
| 5 | 1.685 | 1.443 | 2.51 | 0.339 |
| 6 | 1.653 | 1.179 | 4.92 | 0.424 |
| 7 | 1.018 | 0.813 | 2.13 | 0.508 |
| 8 | 0.918 | 0.686 | 1.37 | 0.593 |
| 9 | 0.894 | 0.762 | 1.37 | 0.678 |
| 10 | 0.884 | 0.740 | 1.50 | 0.763 |
| 11 | 0.878 | 0.720 | 1.62 | 0.848 |
| 12 | .872 | 0.703 | 1.76 | 0.932 |

TABLE VI-continued
CELL RESISTANCE AS A FUNCTION OF EXTENT OF DISCHARGE AT 96.3 mA 175° C.

| Cycle[c] No. | OCV[d] (Volts) | CCV[e] (Volts) | Resist.[f] (Ω) | Discharge[g] Fraction |
|---|---|---|---|---|

[a]Cell Configuration
  Anode   0.500g LiAl (48 a/o)
          0.500g EB Mixture[b]
  Separator 0.500g EB Mixture[b]
            0.500b EB Mixture[b]
  Cathode 0.500g CuCl$_2$ (50–100 mesh)
          0.160g Graphite (Superior-purified)
[b]EB Mixture: Electrolyte (49.85 m/o AlCl$_3$-50.15 m/o NaCl) + 10 w/o Binding Agent (Cab-O-Sil)
[c]Cycle - 10 min discharge followed by 3 min recovery
[d]OCV - Open Circuit Voltage
[e]CCV - Closed Circuit Voltage at time zero for each cycle
[f]Resistance = (OCV - CCV)/0.0963 A
[g]Discharge Fraction = $\sum_{i=1}^{n}$ Coulombs/Total Coulombs where n is the cycle No.

The effect of temperature on single cell performance is manifested by changes in the OCV as the temperature varies and by changes in the lifetime and the energy density output as cells are discharged at different temperatures. The temperature dependence of the OCV was determined between 175° and 275° C. and the data are reported in Table VII. The results clearly indicate that the temperature dependence of the OCV is nonlinear. The Nernst equation predicts a linear increase in the Cu(II)/Cu(I) half cell potential as temperature increases at a constant concentration of reactants and products. It has been previously indicated that Cu(II) is soluble in a chloride ion rich AlCl$_3$ electrolyte. The observed nonlinear increase in the OCV for the CuCl$_2$ cathode suggest that the solubility of CuCl$_2$ increases as the temperature increases, substantiating the results previously obtained.

The effect of temperature on single cell discharge behavior was also studied. The results both to 80% of the ICCV and to zero volts are reported in Table VIII. The overall cell lifetime did not vary appreciably as the temperature increased but the energy density output did. This was due to the shorter lifetime of the high voltage portion of the discharge curve. The data show an abrupt drop in the energy density to 80% of the ICCV at temperatures above 200° C., contrasted to a more gradual decrease in the energy density to zero volts. This difference indicates the Cu(II)/Cu(I) couple is more dependent on temperature than the Cu(I)/Cu(0) couple.

The effect of temperature on cell voltage during cell activation furnished some useful data that correlated qualitatively with the discharge characteristics of single cells. Superior discharge performance was obtained after temperature stabilization when there was an observed cell voltage at room temperature of an undischarged cell and a peak in the OCV—time trace for pure Li and LiAl alloy anodes which was sharp and narrow. Also, a smooth, non-noisy OCV—time trace was observed during activation.

TABLE VII
OPEN CIRCUIT VOLTAGE AS A FUNCTION OF TEMPERATURE

| Temperature (°C.) | OCV[c] (Volts) | S.D.[d] (Volts) | Number of Determinations |
|---|---|---|---|
| 175 | 1.825 | ±0.004 | 20 |
| 200 | 1.832 | ±0.004 | 6 |

TABLE VII-continued

OPEN CIRCUIT VOLTAGE AS A FUNCTION OF TEMPERATURE

| Temperature (°C.) | OCV[c] (Volts) | S.D.[d] (Volts) | Number of Determinations |
|---|---|---|---|
| 225 | 1.845 | ? | 1 |
| 250 | 1.874[e] | ±0.001 | 2 |
| 275 | 1.907 | ? | 1 |

[a]Cell Configuration
Anode
  0.500g LiAl (48.0 a/o)
  0.500g EB Mixture[b]
Separator
  0.900g EB Mixture[b]
Cathode
  0.450g EB Mixture[b]
  0.500g CuCl$_2$ (50–100 mesh)
  0.160g Graphite (Superior-purified)
[b]EB Mixture: Electrolyte (49.85 m/o AlCl$_3$-50.15 m/o NaCl) + 10 w/o Binding Agent (Cab-O-Sil)
[c]OCV - Open Circuit Voltage
[d]S.D. - Standard Deviation
[e]One of the two cells utilized CuCl$_2$ (100 mesh)

TABLE VIII

DISCHARGE BEHAVIOR AS A FUNCTION OF TEMPERATURE AT 15.0 mA/cm$^2$[a]

| Run No. | Temperature (°C.) | ICCV[c] (Volts) | COV[d,e] (Volts) | Lifetime[e] (min) | Energy Density[e] (W-Hr/lb) |
|---|---|---|---|---|---|
| 30 | 175 | 1.733 | 1.387 | 23.5 | 8.99 |
|  |  |  | 0.0 | 112.2 | 23.6 |
| 2 | 200 | 1.738 | 1.391 | 29.7 | 11.5 |
|  |  |  | 0.0 | 110.6 | 26.6 |
| 31 | 225 | 1.768 | 1.414 | 21.0 | 5.58 |
|  |  |  | 0.0 | 119.5 | 27.9 |
| 14 | 250 | 1.721 | 1.377 | 5.63 | 2.18 |
|  |  |  | 0.0 | 110.3 | 22.1 |
| 32 | 275 | 1.812 | 1.450 | 7.25 | 2.97 |
|  |  |  | 0.0 | 92.0 | 19.4 |

[a]Cell Configuration
Anode
  0.500g LiAl (48.0 a/o)
  0.500g EB Mixture[b]
Separator
  0.900g EB Mixture[b]
Cathode
  0.450g EB Mixture[b]
  0.500g CuCl$_2$ (50–100 mesh)
  0.160g Graphite (Superior-purified)
[b]EB Mixture: Electrolyte (49.85 m/o AlCl$_3$-50.15 m/o NaCl) + 10 w/o Binding Agent (Cab-O-Sil)
[c]ICCV - Closed Circuit Voltage at time zero
[d]COV - Cut Off Voltage
[e]First entry of each set to 80% of ICCV; second enety to zero volts.

From a consideration of the above, it can be seen that the single cell studies of the LiAl/NaAlCl$_4$/CuCl$_2$ electrochemical system have shown that it is an excellent candiate for a long life thermal battery. Energy density to 80% of the ICCV at 15.0 mA/cm$^2$ at 200° C. was 11.5 W-Hr/lb in a cell with a 48.0 a/o LiAl alloy anode with significant improvement being obtained using the 60.2 a/o LiAl alloy anode.

While the principles of this invention have been described with particularity, it should be understood that various alterations and modifications may be resorted to without departing from the spirit of the invention, the scope of which is defined by the appended claims.

We claim:

1. A light weight, thermally activated pelletized reserve battery comprising:
   (a) a solid anode composed of a material selected from the group consisting of lithium, aluminum and lithium-aluminum alloys;
   (b) a solid cathode composed of a mixture of (1) Copper (II) Chloride, (2) graphite and (3) an equimolar mixture of aluminum chloride and sodium chloride; and
   (c) a solid alkali tetrachloroaluminate electrolyte positioned between and in contact with said anode and said cathode.

2. A pelletized reserve battery in accordance with claim 1 wherein said anode is composed of a lithium-aluminum alloy.

3. A pelletized reserve battery in accordance with claim 2 wherein said electrolyte is composed of sodium tetrachloroaluminate.

4. A pelletized reserve battery in accordance with claim 1 wherein said solid cathode is composed of a mixture of (1) about 5 parts by weight of Copper (II) Chloride, (2) from about 1 to 3 parts by weight of graphite and (3) about 4.5 parts by weight of an equimolar mixture of aluminum chloride and sodium chloride.

5. A pelletized reserve battery in accordance with claim 1 wherein said solid cathode is composed of a mixture of (1) 5 parts by weight Copper (II) Chloride (2) 1.6 parts by weight graphite and (3) 4.5 parts by weight of an equimolar mixture of aluminum chloride and sodium chloride.

6. A light weight, thermally activated pelletized reserve battery comprising:
   (a) a solid anode composed of lithium;
   (b) a solid cathode composed of a mixture of (1) about 5 parts by weight Copper (II) Chloride, (2) about 1.6 parts by weight graphite and (3) about 4.5 parts by weight of an equimolar mixture of aluminum chloride and sodium chloride; and
   (c) a solid sodium tetrachloroaluminate electrolyte positioned between and in contact with said anode and said cathode.

* * * * *